(12) United States Patent
Yamada et al.

(10) Patent No.: US 8,985,235 B2
(45) Date of Patent: Mar. 24, 2015

(54) ANTI-VIBRATION STRUCTURE FOR A HANDLE OF A PORTABLE BRUSH CUTTER

(75) Inventors: Tetsuya Yamada, Tokyo (JP); Shigemitsu Chigira, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 824 days.

(21) Appl. No.: 13/220,975

(22) Filed: Aug. 30, 2011

(65) Prior Publication Data

US 2012/0048581 A1 Mar. 1, 2012

(30) Foreign Application Priority Data

Aug. 30, 2010 (JP) ................ P. 2010-192915

(51) Int. Cl.
*A01D 34/90* (2006.01)
*A01D 34/82* (2006.01)

(52) U.S. Cl.
CPC ............ *A01D 34/905* (2013.01); *A01D 34/824* (2013.01)
USPC ..................... 173/162.1; 173/162.2

(58) Field of Classification Search
CPC ... A01D 34/824; A01D 34/905; A01D 34/90; A01D 34/82; A01D 34/68
USPC ........ 173/20, 46, 162.1, 162.2; 30/276, 277.4
See application file for complete search history.

(56) References Cited

U.S. PATENT DOCUMENTS

| | | | | |
|---|---|---|---|---|
| 5,692,306 A | * | 12/1997 | Stoll et al. ................. | 30/276 |
| 5,867,911 A | * | 2/1999 | Yates et al. ................ | 30/276 |
| 6,701,623 B2 | * | 3/2004 | Sanders .................... | 30/276 |
| 2003/0037933 A1 | | 2/2003 | Breneman | |
| 2005/0060976 A1 | | 3/2005 | Breneman et al. | |
| 2009/0038283 A1 | * | 2/2009 | Hurley ..................... | 56/12.7 |
| 2009/0307875 A1 | | 12/2009 | Nakashima et al. | |

FOREIGN PATENT DOCUMENTS

| | | |
|---|---|---|
| EP | 1 530 890 A1 | 5/2005 |
| EP | 2 050 328 A1 | 4/2009 |
| EP | 2050328 A1 * | 4/2009 |
| EP | 2 135 713 A2 | 12/2009 |

(Continued)

OTHER PUBLICATIONS

Extended European Search Report in EP 11 17 9220 dated Dec. 29, 2011.

(Continued)

*Primary Examiner* — Andrew M Tecco
*Assistant Examiner* — Nathaniel Chukwurah
(74) *Attorney, Agent, or Firm* — Nixon & Vanderhye P.C.

(57) ABSTRACT

According to one embodiment, there is provided an anti-vibration structure for a handle of a portable brush cutter, the structure including: a pole; an operation unit provided at a front portion of the pole; an engine provided and a lever device provided at a base portion of the pole; an attachment stay unit fixed to a middle portion of the pole, the attachment stay unit having an accommodation recess at each end thereof; an operation handle having a protrusion protruding from each end thereof; and anti-vibration materials sandwiched between the attachment stay unit and the handle main body in a left-right direction of the pole, so that one side of the anti-vibration material is accommodated in the accommodation recess while the protrusion is inserted in an open-groove formed on the other side of the anti-vibration material.

5 Claims, 6 Drawing Sheets

(56) References Cited

FOREIGN PATENT DOCUMENTS

| | | |
|---|---|---|
| JP | UM-S56-062026 | 10/1954 |
| JP | 52-163524 | 6/1976 |
| JP | 59-23923 | 2/1984 |
| JP | 6-31420 | 4/1994 |
| JP | 2005-46087 | 2/2005 |
| JP | 2005-168339 | 6/2005 |
| WO | WO 2004/074707 A1 | 9/2004 |

OTHER PUBLICATIONS

Japanese Office Action dated Apr. 1, 2014 issued in Japanese Patent Application No. 2010-192915, 8 pp.

* cited by examiner

*Fig. 6*

ANTI-VIBRATION STRUCTURE FOR A HANDLE OF A PORTABLE BRUSH CUTTER

CROSS-REFERENCE TO RELATED APPLICATION(S)

This application claims priorities from Japanese Patent Application No. 2010-192915 filed on Aug. 30, 2010, the entire contents of which are herein incorporated by reference.

FIELD

The present disclosure relates to an anti-vibration structure for a handle device in a portable brush cutter in which attachment/replacement of an anti-vibration material to/from a pole is easy and the operation is simple.

BACKGROUND

In general, a brush cutter includes an engine attached at the base portion of the pole to drive an operation unit. A cutter (operation unit) is disposed at the front-end of the pole to connect the engine and the cutter via a transmission shaft. The brush cutter is normally operated by gripping the handle provided in the middle of the pole and operating a group of levers provided near the handle. According to the conventional brush cutter, the vibration of the engine is directly transmitted to the user's hand, and the human body is adversely affected when brush cutting is performed for long time. Thus, it has been proposed to dispose anti-vibration materials, such as anti-vibration rubber or a metal spring, between the pole and the handle or between the pole and the lever device, thereby dampening the vibration from the engine so as not to be transmitted to the handle or to the lever device (for example, see JP-UM-S56-062026-A and JP-2005-046087-A).

In the conventional portable brush cutter, it is necessary to firmly fix the operation handle to the pole so as not to move along the pole, in order to ensure operability after attaching the anti-vibration material. Therefore, the structure is complicated, and the vibration of the operation handle during the operation becomes large.

SUMMARY

One object of the present invention is to provide an anti-vibration structure for a handle device in a portable brush cutter in which the operability is improved by reducing the vibration of the operation handle with the simple structure.

According to a first aspect of the present invention, there is provided an anti-vibration structure for a handle of a portable brush cutter, the structure including: a pole; an operation unit, such as a cutter, provided at a front portion of the pole; an engine provided at a base portion of the pole; a lever device provided at the base portion of the pole and configured to control an operation of the engine; an attachment stay unit fixed to a middle portion of the pole, the attachment stay unit having an accommodation recess at each of left and right ends thereof; an operation handle having a protrusion protruding from each of left and right ends thereof; and anti-vibration materials sandwiched between the attachment stay unit and the handle main body in a left-right direction of the pole, so that one side of the anti-vibration material is accommodated in the accommodation recess while the protrusion is inserted in an open-groove formed on the other side of the anti-vibration material.

According to a second aspect of the present invention, there may be provided the structure, wherein the protrusion and the open grooves each has an H-like shape.

According to a third aspect of the present invention, there may be provided the structure, wherein the attachment stay unit has a recessed groove formed at a center portion thereof, and wherein the attachment stay unit is fixed to the pole at the recessed groove.

According to a fourth aspect of the present invention, there may be provided the structure, wherein the attachment stay unit is dividable into a stay main body and stay outers disposed at both sides thereof, and the accommodation recesses are formed at the stay outers, respectively, and wherein gear-shaped fitting shafts are formed at one of the stay main body and the stay outers, while fitting holes into which the fitting shafts are fitted are formed at the other of the stay main body and the stay outers, so that the stay outers are attached to the stay main body with a different angle around the fitting shafts.

According to a fifth aspect of the present invention, there is provided an anti-vibration structure for a handle of a portable brush cutter, the structure including: a pole; an operation unit, such as a cutter, provided at a front portion of the pole; an engine provided at a base portion of the pole; a lever device provided at the base portion of the pole and configured to control an operation of the engine; and an attachment stay unit fixed to a middle portion of the pole, the attachment stay unit having a protrusion protruding from each of left and right ends thereof; an operation handle having an accommodation recess at each of left and right ends thereof; and anti-vibration materials sandwiched between the attachment stay unit and the handle main body in a left-right direction of the pole, so that one side of the anti-vibration material is accommodated in the accommodation recess while the protrusion is inserted in an open-groove formed on the other side of the anti-vibration material.

According to the first aspect of the present invention, the operation handle is fixed to the attachment stay unit through the anti-vibration materials while the anti-vibration material is accommodated in the accommodation recess of the attachment stay unit. That is, the anti-vibration material is interposed between the operation handle and the pole. Thus, the vibration of the pole is not directly transmitted to the operation handle, but transmitted through the anti-vibration material. Since the vibration of the pole is absorbed and dampened by the anti-vibration material, the vibration transmitted to the operation handle is reduced.

Each of the protrusions formed at both left and right ends of the operation handle is inserted into the open groove of each of the anti-vibration materials, and the anti-vibration material is sandwiched between the attachment stay unit and the operation handle in the left-right direction (radial direction) of the pole. Thus, the anti-vibration material is allowed to deform in the up-down direction (circumferential direction) of the pole along which the attachment stay unit vibrates, thereby efficiently absorbing the vibration.

Since the anti-vibration materials are attached at the left and right portions, the vibration of the operation handle becomes small, and the anti-vibration effect and operability are excellent.

Since the overall structure is simple, assembly performance is also good.

According to the second aspect of the present invention, since the anti-vibration material is accommodated in the accommodation recess of the attachment stay unit, the anti-vibration material is not largely exposed to the outside and unnecessary movement thereof is regulated. Further, since the cross-sections of the protrusion of the operation handle and the open groove of the anti-vibration material into which the protrusion inserted are formed substantially into H-shapes, the up-down and left-right movements of the operation handle can be efficiently regulated.

According to the third aspect of the present invention, a recessed groove is formed at the center portion of the attachment stay unit. To attach the operation handle, the attachment stay unit is simply attached on the pole at the recessed groove, and the pole is firmly fitted and fixed in the recessed groove. Therefore, for example, it is not required to slide the operation handle from/to the end of the pole to attach/replace the operation handle. Thus, the work can be simply performed and assembly performance is excellent.

According to the fourth aspect of the present invention, the gear-shaped fitting shafts are formed at one of the stay main body and the stay outers, and the fitting holes into which the fitting shafts are fitted are formed at the other of the stay main body and the stay outers. And, the stay outer can be attached at a different angle with respect to the stay main body around the fitting shaft, that is, the left-right direction (radial direction) of the pole. Therefore, a handle angle can be optimally adjusted so that that the user can easily keep, in accordance with the modes of the weed scraping operation (e.g., a higher place or a lower place).

According to the fifth aspect of the present invention, the same advantage can be achieved as in the first aspect of the present invention, when positions of the protrusion and the accommodation recess are interchanged between the attachment stay unit and the operation handle.

DETAILED DESCRIPTION

Figure 1A:
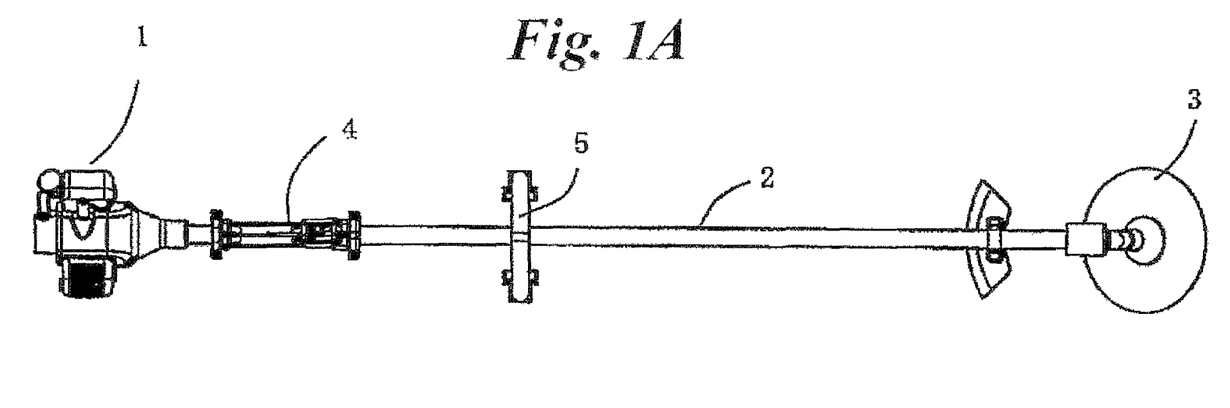
FIGS. 1A and 1B are a plan view and a side view of an entire portable brush cutter, respectively.
Figure 1B:
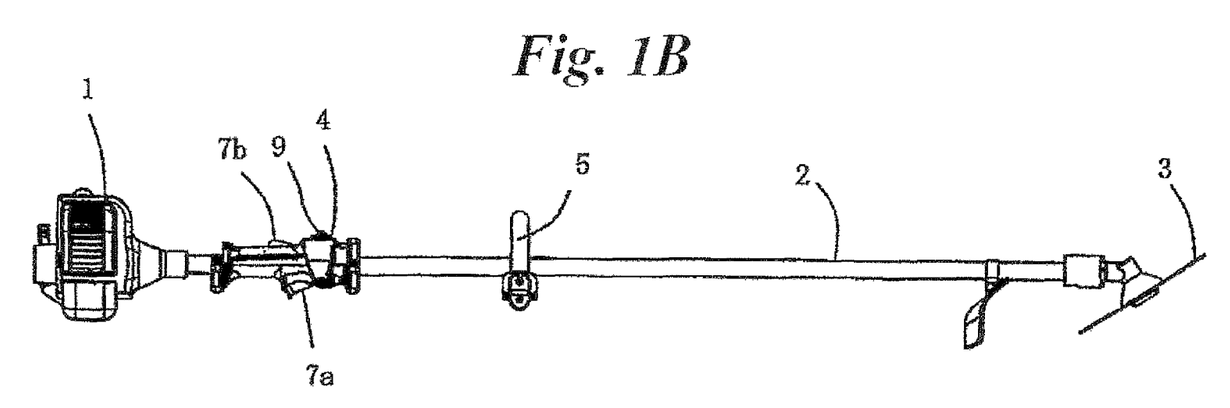
Figure 2:
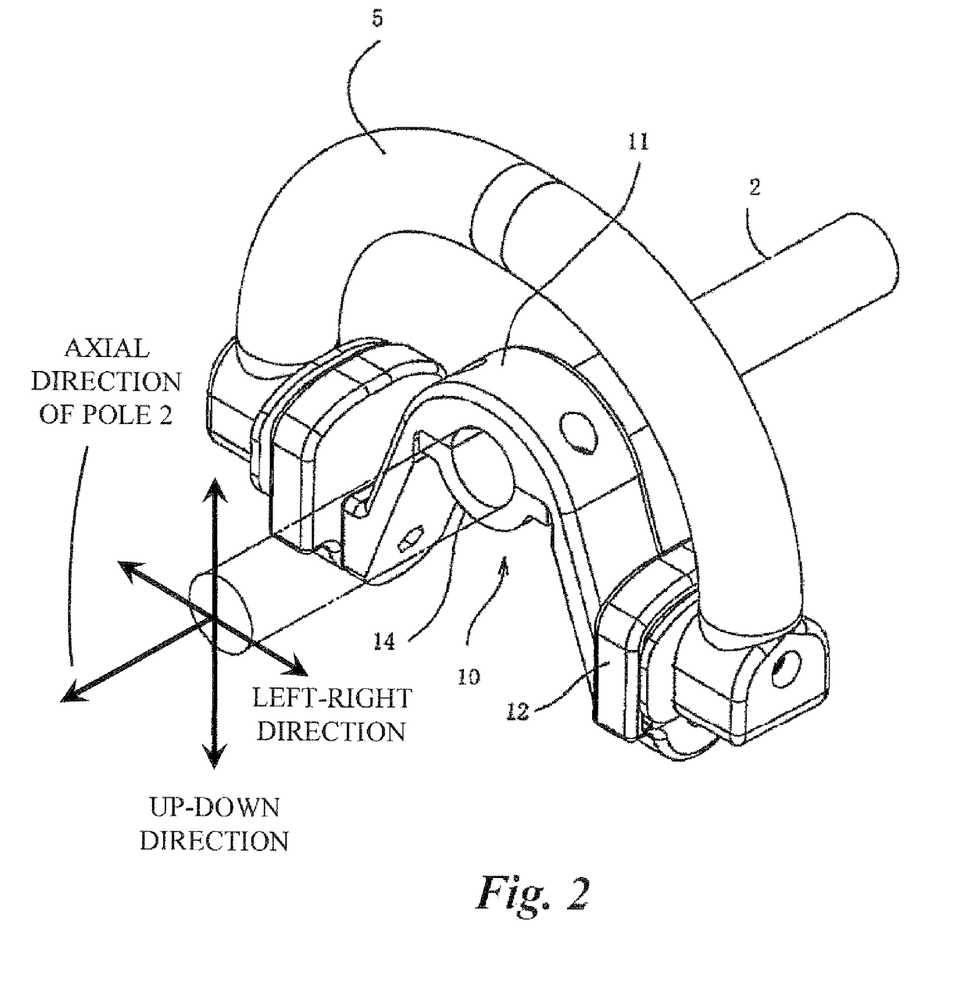
FIG. 2 is a perspective view of the handle of the portable brush cutter of the present disclosure.
Figure 3:
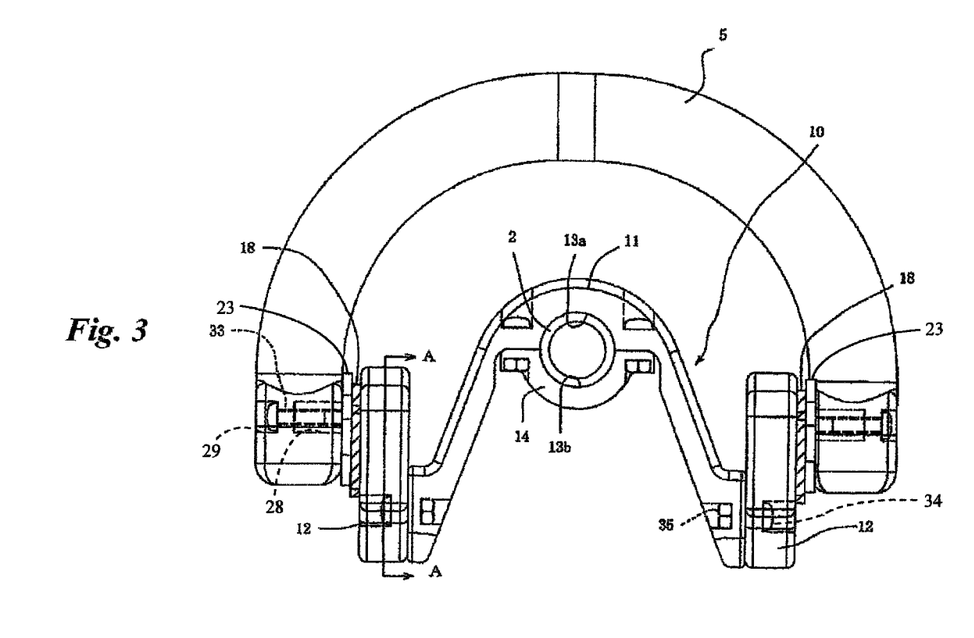
FIG. 3 is a front view of the operation handle.
Figure 4:
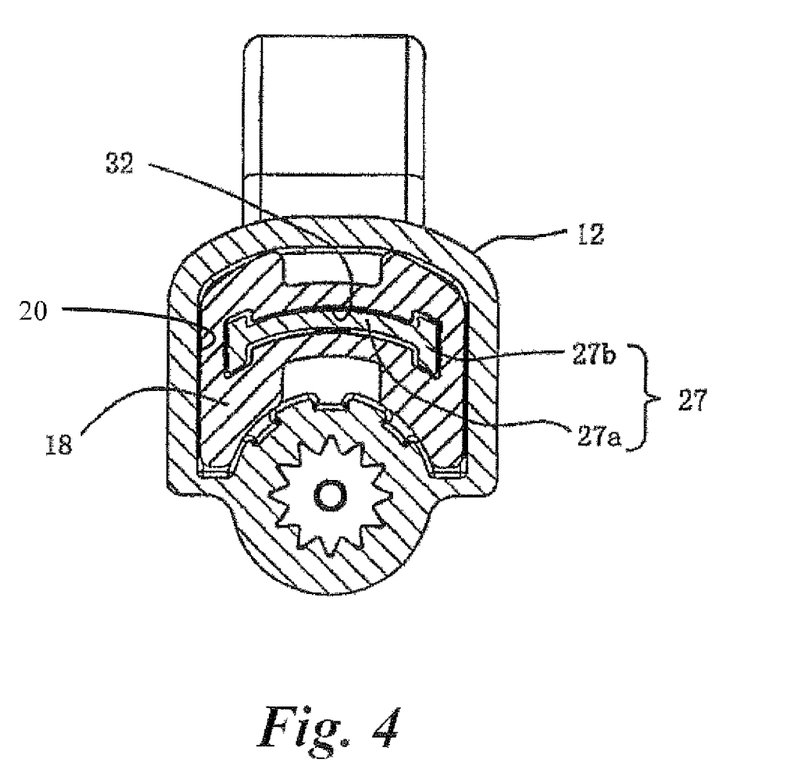
FIG. 4 is a cross-sectional view taken along line A-A of FIG. 3.

A portable brush cutter of an embodiment, as shown in FIGS. 1A and 1B, includes an engine 1 and a pole 2. The base portion of the pole 2 is connected to the engine 1, so as to be extended therefrom. A cutter 3 (an operation unit) is rotatably supported at the end of the pole 2, and a lever device 4 is attached to the engine side of the pole 2. The lever device 4 has a lever linked with a throttle wire, and the operation of the engine is controlled by the lever through the throttle wire. The user can perform a brush cutting operation with the bush cutter such that the user suspends the brush cutter downwardly while gripping a handle 5 provided at the pole 2 to control the angle and direction of the cutter 3, and adjusts the output of the engine 1 through the lever device 4.

The pole 2 is a hollow pipe in which a transmission shaft (not shown) is rotatably supported, and the base portion of the transmission shaft is connected to the engine 1 through a clutch. The transmission shaft rotates the cutter 3 rotatably supported at the front-end of the pole 2 by being driven by the engine 1.

The lever device 4 is attached to the middle portion of the pole 2 at the engine 1 side. By appropriately positioning the lever device 4, the user can grip the lever of the lever device 4 with an appropriate weight balance so that the brush cutter is efficiently operated.

The lever device 4 is formed into a cylindrical shape to be easily held by a hand, and includes plural levers and throttle wires to be operated. As shown in FIG. 1B, a throttle lever 7a is positioned so as to be easily operated in a hand-held state. The output of the engine 1 is controlled by the throttle lever 7a through throttle wire 8. Further, an engine stop switch 9 slidably operated by finger, a safety lever 7b that locks the operation of the throttle lever 7a etc. are provided.

The brush cutter has the structure as described above.

An operation handle 5 is attached to the pole 2 between the lever device 4 and the cutter 3 (operation unit). Next, an anti-vibration structure for the operation handle 5 will be described in detail.

As shown in FIGS. 2 to 5B, an attachment stay unit 10 for attaching the operation handle 5 thereon is fixed to the pole 2. The attachment stay unit 10 is divided into a stay main body 11 that bends in a "<"-like shape and stay outers 12 disposed at both sides of the stay main body 11.

A fixing block 14 is fixable to a center portion of the stay main body 11. A semicircular recessed groove 13a is formed in the center portion of the stay main body 11, and a semicircular recessed groove 13b is formed in the fixing block 14. The semicircular recessed grooves 13a and 13b form a circular opening having a size that can fit to the pole 2. Both end surfaces of the stay main body 11 are faced away from each other, and a fitting shaft 16 having a gear-shaped cross-section is formed at the center of each end surface. Each fitting shaft 16 is provided with a bolt hole 17 penetrating centrally therethrough. Each of the stay outers 12 is a block-like member. An accommodation recess 20 is formed at the outside of the stay outer 12 so that an anti-vibration material 18 is accommodated therein, and a fitting hole 21 having a gear-shaped cross-section is formed at the inside of the stay outer 12 so that the fitting shaft 16 of the stay main body 11 is fitted therewith. The lower surface of the accommodation recess 20 is formed into a concave-convex shape.

The operation handle 5 attached to the attachment stay unit 10 is divided into a handle main body 22 and a handle base member 23. The handle main body 22 is formed into a substantially C-shape, and has both inner end surfaces facing each other and both outer end surfaces facing away from each other. At each end of the handle main body 22, a straight groove 25 is formed at the inner end surface, and a screw insertion hole 29 is formed at the outer end surface so as to reach the straight groove 25. The handle base member 23 includes a plate member 23a, a fitting piece 26 protruding from one side of the plate member 23a and an H-shaped protrusion 27 protruding from the other side of the plate member 23a. The H-shaped protrusion 27 includes a center piece 27a and end pieces 27b. The fitting piece 26 is formed to be fitted on the straight groove 25 of the handle main body 22, and a screw hole 28 is formed at the center of the fitting piece 26. The center piece 27a of the protrusion 27 is curved.

Figure 5A:
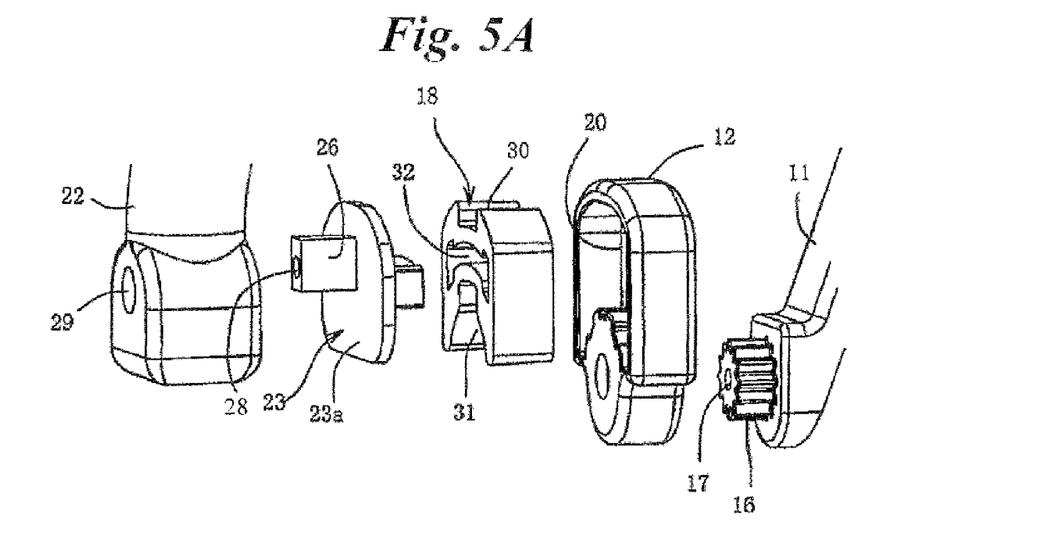
FIG. 5A is an exploded perspective view of the handle.
Figure 5B:
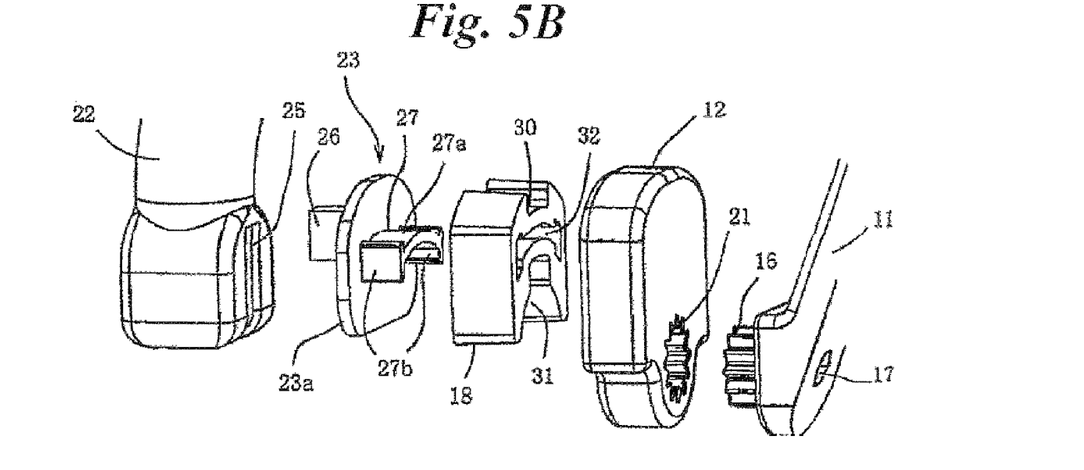
FIG. 5B is an exploded perspective view seen from another angle.

The plate shape body 23a of the handle base member 23 is formed larger than an open side of the accommodation recess 20 of the stay outer 12.

The operation handle 5 is attached to the attachment stay unit 10 through the anti-vibration materials 18. The anti-vibration material 18 is provided as a block made of an elastic member, such as elastomer. The anti-vibration material 18 has parallel side surfaces, and curved upper and lower surfaces. In the anti-vibration material 18, recesses 30 and 31 are formed at the center portions of the upper and lower surfaces, and a substantially H-shaped open groove 32 with the center portion curved in an arc shape passes through between the upper and lower recesses 30 and 31. The open groove 32 is sized and shaped so that the protrusion 27 of the handle base member 23 is inserted therein. The thickness of the anti-vibration material 18 is larger than the depth of the accommodation recess 20 of the stay outer 12.

The above-mentioned components are assembled, as follows. First, the fitting piece 26 of the handle base member 23 is fitted in the straight groove 25 of the handle main body 22, and the H-shape protrusion 27 of the handle base member 23 is inserted in the H-shaped open groove 32 of the anti-vibration material 18. The anti-vibration material 18 is accommodated in the accommodation recess 20 of the stay outer 12, and the fitting shaft 16 of the stay main body 11 is fitted in the fitting hole 21 of the stay outer 12. Then, a screw 33 (see FIG. 3) is threaded into the insertion hole 29 of the handle main body 22 and into the screw hole 28 of the handle base member 23, from the outer end surface of the handle main body 22, thereby integrally combining the handle main body 22 and the handle base member 23. And, a bolt 34 (see FIG. 3) is inserted in the bolt hole 17 of the fitting shaft 16 from the outer side the stay outer 12, and is threaded with a nut 35 disposed inside the stay main body 11, thereby assembling the attachment stay unit 10. As a result, the anti-vibration material 18 is sandwiched between the attachment stay unit 10 and the operation handle 5 in the left-right direction (radial direction) of the pole 2. Since the thickness of the anti-vibration material 18 is larger than the depth of the accommodation recess 20 of the stay outer 12, the stay outer 12 and the handle base member 23 are not in contact.

The operation handle 5 is attached to the pole 2, as follows. First, the recessed groove 13a at the center portion of the stay main body 11 is held on the pole 2, and the recessed groove 13b of the fixing block 14 is brought into contact with the pole 2 from the opposite side so that the pole 2 is fitted between the fixing block 14 and the stay main body 11. Then, the stay main body 11 and the fixing block 14 are firmly fastened by the bolts and the nuts.

The angle of the stay main body 11 and the stay outer 12 is selectable by adjusting the fitting state of the gear-shaped fitting shaft 16 of the stay main body 11 and the fitting hole 21 of the stay outer 12.

As a result, the operation handle 5 can be attached at different angles around the fitting shaft 16, that is, around the left-right direction (radial direction) of the pole 2 by selecting the angle of the stay main body 11 and the stay outer 12.

The operation handle 5 is fixed to the attachment stay unit 10 through the anti-vibration materials 18 while the anti-vibration material 18 is accommodated in the accommodation recess 20 of the attachment stay unit 10. That is, the anti-vibration material 18 is interposed between the operation handle 5 and the pole 2. Thus, the vibration of the pole 2 is not directly transmitted to the operation handle 5, but transmitted through the anti-vibration material 18. Since the vibration of the pole 2 is absorbed and dampened by the anti-vibration material 18, the vibration transmitted to the operation handle 5 is reduced.

Each of the protrusions 27 formed at both left and right ends of the operation handle 5 is inserted into the open groove 32 of each of the anti-vibration materials 18, and the anti-vibration material 18 is sandwiched between the attachment stay unit 10 and the operation handle 5 in the left-right direction (radial direction) of the pole 2. Thus, the anti-vibration material 18 is allowed to deform in the up-down direction (circumferential direction) of the pole 2 along which the attachment stay unit 10 vibrates, thereby efficiently absorbing the vibration.

Since the anti-vibration materials 18 are attached at the left and right portions, the vibration of the operation handle 5 becomes small, and the anti-vibration effect and operability are excellent.

The recesses 30 and 31 are formed on the anti-vibration material 18, the opening area of the accommodation recess 20 of the stay outer 12 is set larger than the area of the anti-vibration material 18. Thus, the deformable amount of the anti-vibration material 18 within the accommodation recess 20 can be set large, and the deformation of the anti-vibration material 18 can be effectively absorbed.

Since the overall structure is simple, assembly performance is also good.

As shown in FIG. 5B, the accommodation recess 20 for the anti-vibration material 18 is formed in the attachment stay unit 10, and the cross-sections of the protrusion 27 of the operation handle 5 and the open groove 32 of the anti-vibration material 18 into which the protrusion 27 is inserted are formed substantially into H-shapes. As a result, the up-down movement of the center piece 27a is regulated by the horizontal groove walls of the center portion of the open groove 32, whereas the left-right movement of the end pieces 27b is regulated by the vertical groove walls at both left and right ends of the open groove 32. Thus, the up-down and left-right movements of the operation handle 5 can be efficiently regulated.

The operation handle 5 is attached by combining the attachment stay unit 10 and the fixing block 14 with the pole 2 interposed therebetween. And, for example, it is not required to slide the operation handle 5 from/to the end of the pole 2 to attach/replace the operation handle 5. Thus, the work can be simply performed and assembly performance is excellent.

The gear-shaped fitting shafts 16 are formed at one of the stay main body 11 and the stay outers 12, and the fitting holes 21 into which the fitting shafts 16 are fitted are formed at the other of the stay main body 11 and the stay outers 12. And, the stay outer 12 can be attached at a different angle with respect to the stay main body 11 around the fitting shaft 16, that is, around the left-right direction (radial direction) of the pole 2. Therefore, a handle angle can be optimally adjusted so that the user can easily keep, in accordance with the modes of the weed scraping operation (e.g., a higher place or a lower place).

Instead of forming the accommodation recess 20 at the attachment stay unit 10 and forming the protrusion 27 at the handle base member 23, it may be possible to form the protrusion 27 at the attachment stay unit 10 and form the accommodation recess 20 at the handle base member 23.

Figure 6:
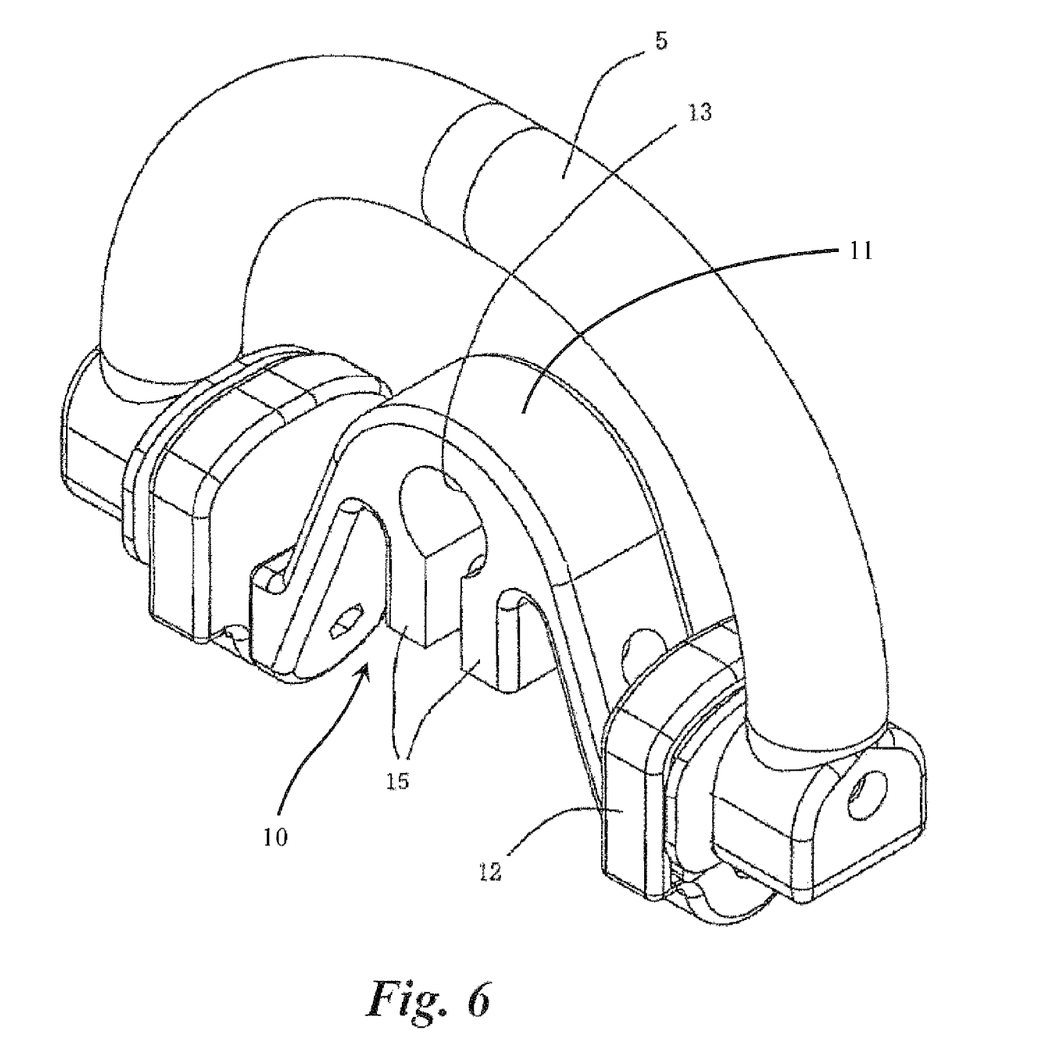
FIG. 6 is a perspective view showing another example of an attachment stay unit.

As shown in FIG. 6, the recessed groove 13 having an arc-shaped cross-section may be formed at the center portion of the stay main body 11, and two fixing pieces 15 may be formed extending from both open ends of the recessed groove 13. In this case, the operation handle 5 is attached to the pole 2, as follows. First, the recessed groove 13 at the center portion of the stay main body 11 is forcibly pushed and widened to be held on the pole 2. Then, two fixing pieces 15 are firmly fastened and fixed by bolts and nuts.

The invention claimed is:
1. An anti-vibration structure for a handle of a portable brush cutter, the portable brush cutter including a pole, an operation unit provided at a front portion of the pole, an engine provided at a base portion of the pole, and a lever device provided at the base portion of the pole and configured to control an operation of the engine, the anti-vibration structure comprising:

an attachment stay unit fixed to a middle portion of the pole, the attachment stay unit having a protrusion protruding from each of left and right ends thereof;

an operation handle having an accommodation recess at each of left and right ends thereof; and anti-vibration materials sandwiched between the attachment stay unit and the handle main body in a left-right direction of the pole, so that one side of the anti-vibration material is accommodated in the accommodation recess while the protrusion is inserted in an open-groove formed on the other side of the anti-vibration material, wherein the protrusion and the open groove each has an H-like shape, wherein a center portion of the H-like shape extends in a widthwise direction relative to the accommodation recess to regulate up-down movement of the protrusion, wherein end portions of the H-like shape extend transversely from each end of the center portion to regulate left-right movement of the protrusion, and wherein the center portion of the H-like shape is longer than the end portions of the H-like shape.

2. An anti-vibration structure for a handle of a portable brush cutter, the portable brush cutter including a pole, an operation unit provided at a front portion of the pole, an engine provided at a base portion of the pole, and a lever device provided at the base portion of the pole and configured to control an operation of the engine, the anti-vibration structure comprising:

an attachment stay unit fixed to a middle portion of the pole, the attachment stay unit having an accommodation recess at each of left and right ends thereof;

an operation handle having a protrusion protruding from each of left and right ends thereof; and anti-vibration materials sandwiched between the attachment stay unit and the handle main body in a left-right direction of the pole, so that one side of the anti-vibration material is accommodated in the accommodation recess while the protrusion is inserted in an open-groove formed on the other side of the anti-vibration material, wherein the protrusion and the open groove each has an H-like shape, wherein a center portion of the H-like shape extends in a widthwise direction relative to the accommodation recess to regulate up-down movement of the protrusion, wherein end portions of the H-like shape extend transversely from each end of the center portion to regulate left-right movement of the protrusion, and wherein the center portion of the H-like shape is longer than the end portions of the H-like shape.

3. The structure of claim 2, wherein the attachment stay unit has a recessed groove formed at a center portion thereof, and wherein the attachment stay unit is fixed to the pole at the recessed groove.

4. The structure of claim 2, wherein the attachment stay unit is dividable into a stay main body and stay outers disposed at both sides thereof, and the accommodation recesses are formed at the stay outers, respectively, and wherein gear-shaped fitting shafts are formed at one of the stay main body and the stay outers, while fitting holes into which the fitting shafts are fitted are formed at the other of the stay main body and the stay outers, so that the stay outers are attachable to the stay main body with a different angle around the fitting shafts.

5. The structure of claim 2, wherein the center portion is arc-shaped.

* * * * *